(12) United States Patent
Karimzadehgan et al.

(10) Patent No.: US 8,874,559 B1
(45) Date of Patent: Oct. 28, 2014

(54) RANKING AND ORDERING ITEMS IN USER-STREAMS

(71) Applicants: Maryam Karimzadehgan, Urbana, IL (US); Daniel Wyatt, San Francisco, CA (US); Andrew Tomkins, San Jose, CA (US)

(72) Inventors: Maryam Karimzadehgan, Urbana, IL (US); Daniel Wyatt, San Francisco, CA (US); Andrew Tomkins, San Jose, CA (US)

(73) Assignee: Google Inc., Mountain View, CA (US)

( * ) Notice: Subject to any disclaimer, the term of this patent is extended or adjusted under 35 U.S.C. 154(b) by 92 days.

(21) Appl. No.: 13/632,308

(22) Filed: Oct. 1, 2012

(51) Int. Cl.
*G06F 17/30* (2006.01)

(52) U.S. Cl.
USPC .......................................... 707/723; 707/707

(58) Field of Classification Search
USPC ................................................ 707/723, 707
See application file for complete search history.

(56) References Cited

U.S. PATENT DOCUMENTS

| | | | |
|---|---|---|---|
| 8,095,432 B1 | 1/2012 | Berman et al. | |
| 8,145,584 B2 | 3/2012 | Juan et al. | |
| 8,171,128 B2 | 5/2012 | Zuckerberg et al. | |
| 8,244,848 B1 | 8/2012 | Narayanan et al. | |
| 8,402,094 B2 | 3/2013 | Bosworth et al. | |
| 2011/0106895 A1* | 5/2011 | Ventilla et al. | 709/206 |
| 2012/0290565 A1* | 11/2012 | Wana et al. | 707/723 |
| 2013/0036112 A1* | 2/2013 | Poon | 707/723 |
| 2013/0332523 A1* | 12/2013 | Luu | 709/204 |

OTHER PUBLICATIONS

Abhinandan Das et al., "Google News Personalization: Scalable Online Collaborative Filtering," Proceedings of the Proceedings of the 16th International Conference on World Wide Web (WWW'07), May 8-12, 2007, Canada, pp. 271-280.
Frank Dellaert, "The Expecation maximization Algorithim," College of Computing, Georgia Institute of Technical Report number GIT-GVU-02-20, Feb. 2002, 7 pages.
Jeff A. Bines, "A Gentle Tutorial of the EM Algorithm and its Application to Parameter Estimation for Gaussian Mixture and Hidden Markov Models,"International Compter Science Institute, Technical Report number TR-97-021, Apr. 1998, 15 pages.
Junichiro Mori et al., "Real-world Oriented Information Sharing Using Social Networks,"Proceedings of the 2005 International ACM SIGGROUP Conference on Supporting Group Work (Group 05), Nov. 6-9, 2005, pp. 81-84.

* cited by examiner

*Primary Examiner* — Etienne Leroux
*Assistant Examiner* — Cindy Nguyen
(74) *Attorney, Agent, or Firm* — Fish & Richardson P.C.

(57) ABSTRACT

Methods, systems, and apparatus, including computer programs encoded on a computer storage medium, for identifying a set of items that are displayed to a user of a social networking service, the items comprising digital content distributed using the social networking service and being associated with item features, the item features comprising item-dependent features and user-dependent features; receiving feature values that are associated with one of an item-dependent feature and a user-dependent feature; receiving probabilities that are associated with a group and reflecting a likelihood that the user is a type of user associated with the group, the groups including a set of weights; determining an item score based on the feature values and a set of weights to provide item scores, the set of weights being identified based on the probabilities; and determining a subset of items to be displayed to the user based on the item scores.

30 Claims, 8 Drawing Sheets

RANKING AND ORDERING ITEMS IN USER-STREAMS

BACKGROUND

This specification generally relates to displaying content distributed to users in a social networking service.

Internet-based social networking services provide a digital medium for users to interact with one another and share information. For examples, users are able to distribute digital content (e.g., textual comments, digital images, digital videos, digital audio, hyperlinks to websites, etc.) to other users that they might be connected within the social networking service. Digital content that is distributed to a user can be displayed to the user in a stream page.

As a user's social network within the social networking service increases, the amount of digital content distributed to the user and the amount of digital content that the user interacts with can significantly increase. Consequently, the user's stream page may overwhelm the user with digital content, which can include digital content that may not be relevant to the user and/or digital content that may be of low quality (e.g., spam).

SUMMARY

In general, innovative aspects of the subject matter described in this disclosure may be embodied in methods that include the actions of identifying a set of items that are displayed to a user of a social networking service, one or more items of the set of items comprising digital content distributed using the social networking service and being associated with a plurality of item features, the plurality of item features comprising item-dependent features and user-dependent features; for one or more items in the set of items, receiving a plurality of feature values, the feature values being associated with one of an item-dependent feature and a user-dependent feature; receiving a plurality of probabilities, one or more probabilities of the plurality of probabilities being associated with a group of a plurality of groups and reflecting a likelihood that the user is a type of user associated with the group, one or more groups in the plurality of groups including a set of weights; for one or more items in the set of items, determining an item score based on the plurality of feature values and at least one set of weights to provide a plurality of item scores, the at least one set of weights being identified based on the plurality of probabilities; and determining a subset of items to be displayed to the user based on the plurality of item scores, the subset of items comprising items of the plurality of items.

Other implementations of this aspect include corresponding systems, apparatus, and computer programs, configured to perform the actions of the methods, encoded on computer storage devices.

These and other implementations may each optionally include one or more of the following features. For instance, for one or more items in the set of items, determining a plurality of item sub-scores, the item sub-scores being based on a group and being determined based on the plurality of feature values and the set of weights provided for the group; and for one or more items in the set of items, determining the item score based on the plurality of item sub-scores and the plurality of probabilities. Determining the item score is based on the plurality of item sub-scores and the plurality of probabilities comprises multiplying each sub-item score by a respective probability of the plurality of probabilities. The probabilities in the plurality of probabilities vary based on activity of the user within the social networking service. Selecting a group based on the plurality of probabilities, the item score being determined based on the set of weights associated with the group. Selecting a group based on the plurality of probabilities comprises selecting the group having a highest probability. Transmitting instructions to display items in the subset of items to the user. Determining a rank order based on the plurality of items scores, the items being displayed based on the rank order. Each user-dependent feature includes a feature value that varies between a plurality of users. Each item-dependent feature includes a feature value that is static between a plurality of users. At least one set of weights of the sets of weights included by the group of the plurality of groups varies based on an activity of one or more users of the social networking service.

Implementations of the present disclosure provide one or more of the following example advantages. Implementations increase the relevance of the social networking service to the users by more prominently displaying items that might be more relevant to respective users. Implementations promote conversational use of the social networking service and help ensure that users do not miss important content. Implementations also enable users to use their time more efficiently by filtering out low quality content.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers represent corresponding parts throughout.

DETAILED DESCRIPTION

Figure 1:
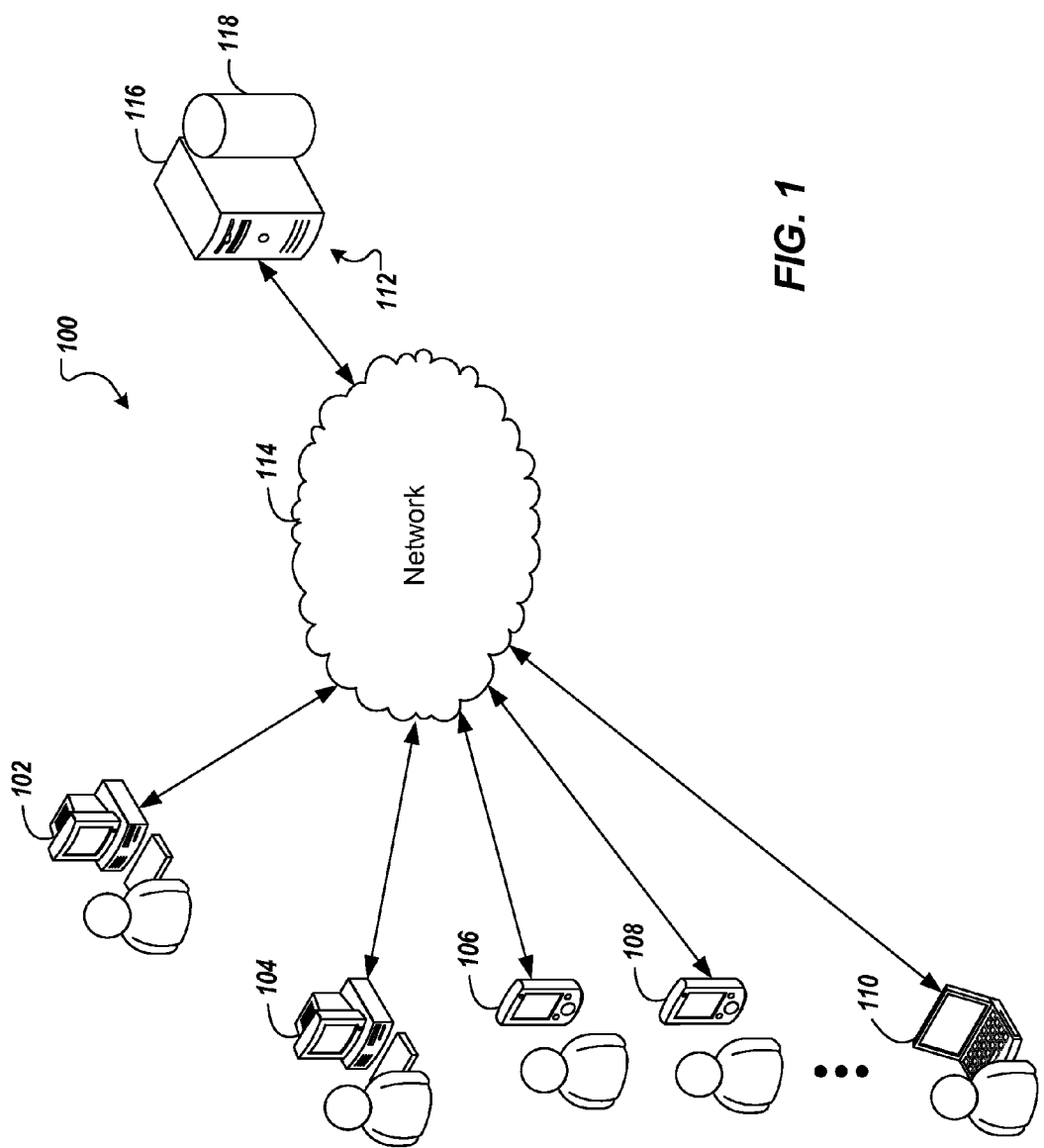
FIG. 1 is a diagram of an example network architecture.

In general, implementations of the present disclosure are directed to displaying items in stream pages of users of a social networking service. In particular, implementations of the present disclosure are directed to ranking and ordering items displayed to a user within a stream page of the user based on one or more groups that the user can be associated with. The stream page displays digital items that have been posted by the user to the social networking service and/or digital items distributed to the user through the social networking service. In some examples, each item that is to be displayed in the stream page of a user is associated with an item score. Items are displayed within the stream page of the user based on the item scores. In some examples, the most relevant, highest quality items (e.g., highest scoring) are displayed more prominently to the user.

In some examples, each item includes an associated item score on a per recipient (per user) basis. For example, an author user can generate the item and can distribute the item to a plurality of users of the social networking service. A user-dependent item score can be associated with the item. The item can be associated with a list of item features. In some examples, the item features relate to respective characteristics of the item and can have respective values.

In some implementations, one or more features of the item can be item-dependent (e.g., "item-dependent features") and one or more features can be user-dependent (e.g., "user-dependent features"). In some examples, item-dependent features can be assigned respective values that are item-specific. That is, for example, values assigned to item-dependent features do not vary with respect to different users that might access the item. In some examples, user-dependent features can be assigned respective values that are user-specific. That is, for example, values assigned to user-dependent features can vary with respect to different users that might access the item.

In some examples, the item-dependent features can relate to (or be associated with) the content of the items (e.g., a status of the author of the item, an image provide in the item, a video provided in the item, a hyperlink provided in the item). In some examples, values associated with item-dependent features do not vary with respect to different users that might access the item. For example, if an item includes an image, a first value (e.g., 1) can be assigned to an image-feature of the item, or if the item does not include an image, a second value (e.g., 0) can be assigned to the image-feature of the item. The assigned value (e.g., the first value or the second value) is static regardless of which user might access the item.

In some examples, the user-dependent features are dependent on the specific user (e.g., the user-dependent features are evaluated from the perspective of the specific user that is accessing the item). In some implementations, the user-dependent features can include features based on a relationship between the specific user and an author of the item, and/or a relationship between the specific user and other users to which the item is accessible and/or whom have interacted with the item. In some examples, a social affinity value between the specific user and the author and/or other users associated with the item can be provided. In some examples, social affinity can be based on the type of computer-implemented interactive service between the user and the author (e.g., electronic message interactions, chat interactions, and social networking service interactions). In some examples, the social networking service interactions can include viewing, commenting, sharing, and/or endorsing items (e.g., an item associated with another user) by the user.

In some examples, values associated with user-dependent features vary with respect to different users that might access the item. For example, a first value (e.g., 1) can be assigned to an author-feature of the item for a first user that has a reciprocal (symmetrical) relationship with the author within a social networking service. A second value (e.g., 0) can be assigned to the author-feature of the item for a second user that does not have a reciprocal (symmetrical) relationship with the author within a social networking service. Consequently, the assigned value (e.g., the first value or the second value) is dynamic depending on respective users that might access the item.

In some implementations, the item can further include features relating to other (e.g., miscellaneous) aspects of the item, such as features relating to whether the item has emoticons (and/or the number of emoticons, and the type of emoticons); the length of the item (e.g., the number of characters of the item); and whether the item includes a video and/or image.

In some implementations, the user can be associated with one or more groups. In some examples, each group can reflect a type of user. An example type of user can include users that typically view and/or interact with items that are distributed by other users that are known to the user. Another example type of user can include users that typically view and/or interact with items that include particular content (e.g., images, videos, hyperlinks). Another example type of user can include users that typically view and/or interact with items that are distributed by other users that are deemed to be popular users (e.g., a well known actor, artist, musician, politician). In some examples, one or more probabilities can be provided, each probability reflecting a likelihood that the user is the type of user reflected by the respective group. In some examples, the one or more probabilities can be provided based on log data. In some examples, the log data can be associated with the particular user. In some examples, the log data can be associated with one or more anonymous users.

In some implementations, each user-dependent item score associated with a respective item can be determined based on a plurality of values associated with features of the item (e.g., user-dependent features and/or item-dependent features) and one or more groups that the respective user is associated with. In some examples, each group can provide a respective set of weights, each weight being associated with a particular feature. In some examples, the weights can be applied to the values associated with the respective features to provide weighted values. In some examples, the user-dependent item score for a respective item can be determined based on the weighted values. In some examples, for each user and each item, a plurality of user-dependent item scores can be determined, each user-dependent item score being associated with a respective group. In some examples, the respective probabilities that the user is associated with each group can be applied to provide an overall item score for the item. In some implementations, a set of items can be selected for display to the user based on the overall item scores. In some implementations, items in the set of items can be ranked for display to the user based on the overall item scores.

Implementations of the present disclosure will be discussed with reference to an example computer-implemented social networking service. The example social networking service includes social circles. It is appreciated, however, that implementations of the present disclosure are applicable to any appropriate social networking service and are not limited to social networking services that include social circles or features that parallel the functionality of social circles.

FIG. 1 is a diagram of an example network architecture 100. The network architecture 100 includes a number of client devices 102, 104, 106, 108, 110 communicably connected to a server system 112 by a network 114. The server system 112 includes a processing device 116 and a data store 118. The processing device 116 executes computer instructions (e.g., social network computer program code, and/or IM computer program code) stored in the data store 118 to perform the functions of a social network server and/or IM server.

Users of the client devices 102, 104, 106, 108, 110 access the server device 112 to participate in a social networking service. For example, the client devices 102, 104, 106, 108, 110 can execute web browser applications that can be used to access the social networking service and/or an IM service. In another example, the client devices 102, 104, 106, 108, 110 can execute software applications that are specific to the social networking service and/or the IM service (e.g., social networking and/or IM "apps" running on smartphones).

Users interacting with the client devices 102, 104, 106, 108, 110 can participate in the social networking service provided by the server system 112 by digital content, such as text comments (e.g., updates, announcements, replies), digital images, videos, audio files, and/or other appropriate digital content. In some implementations, information can be posted on a user's behalf by systems and/or services external to the social networking service or the server system 112. For example, the user may post a review of a movie to a movie review website, and with proper permissions that website may cross-post the review to the social networking service on the user's behalf. In another example, a software application executing on a mobile device, with proper permissions, may use global positioning system (GPS) capabilities to determine the user's location and automatically update the social network with his location (e.g., "At Home", "At Work", "In Austin, Tex."). Generally, users interacting with the client device 102, 104, 106, 108, 110 can also use the social networking service provided by the server system 112 to define social circles to organize and categorize the user's relationships to other users of the social networking service. Examples of the creation and use of social circles are provided in the description of FIG. 2.

In some implementations, the client devices 102, 104, 106, 108, 110 can be provided as computing devices such as laptop or desktop computers, smartphones, personal digital assistants, portable media players, tablet computers, or other appropriate computing devices that can be used to communicate with an electronic social network. In some implementations, the server system 112 can be a single computing device such as a computer server. In some implementations, the server system 112 can represent more than one computing device working together to perform the actions of a server computer (e.g., cloud computing). In some implementations, the network 114 can be a public communication network (e.g., the Internet, cellular data network, dialup modems over a telephone network) or a private communications network (e.g., private LAN, leased lines).

Figure 2:
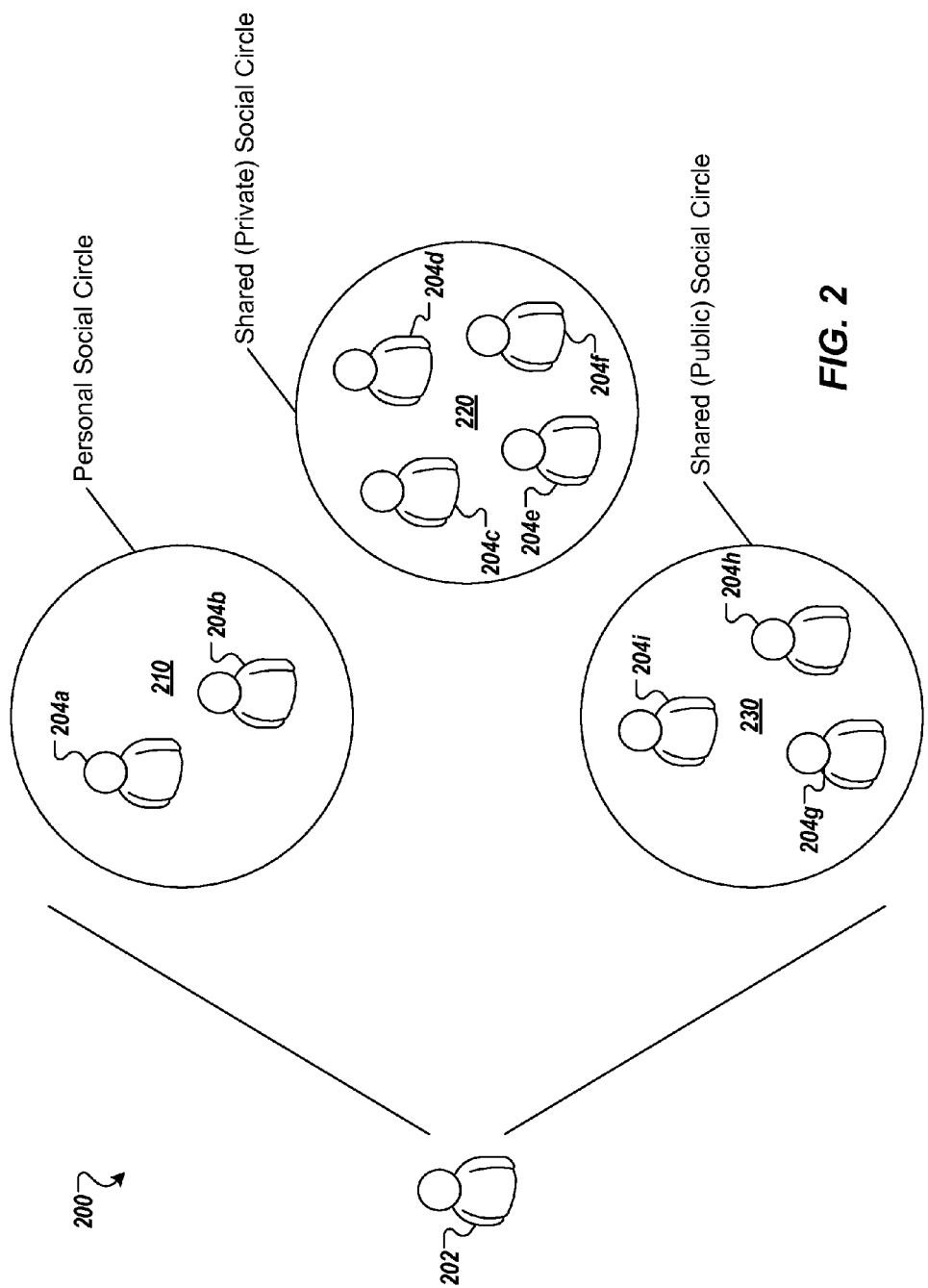
FIG. 2 is a diagram of an example social network including social circles.

FIG. 2 is a diagram of an example social network 200 including social circles. A user 202 is a member of a social network that supports the creation and use of social circles (e.g., the social network provided by the server device 112 of FIG. 1). In the present example, the user 202 has a number of contacts 204a-204i with which the user 202 can have some form of relationship (e.g., friends, coworkers, customers, teammates, clients, relatives, club members, classmates). The user 202 categorizes the contacts 204a-204i by assigning them to one or more social circles, such as a social circle 210, a social circle 220, and a social circle 230.

The social circle 210 is a personal circle. In some implementations, personal circles are groupings created by and may be known only to the user 202 (e.g., the contacts 204a, 204b may receive no indication that they are in the user's 202 personal social circle 210). In some implementations, personal social circles are groupings created by the user 202 and may be known to the user 202 as well as the contacts (e.g., contacts 204a, 204b) that are members of the social circle (e.g., the contacts 204a, 204b receive an indication that they have been added to the personal social circle 210).

In some implementations, personal circles may be used to organize and categorize the contacts 204a-204i in ways that are relevant to the user 202. In some implementations, the user 202 may use personal social circles to organize contacts in order to discretely target which of his contacts 204a-204i will see certain postings or have access to particular information. For example, the user 202 may be planning a surprise party for a small group of friends. As such, the user can organize contacts into "Surprise Party Attendees" and "Surprise Party Honorees" personal circles. By doing so, the user 202 may better target selected postings to the friends attending and/or helping to plan the surprise party (e.g., Surprise Party Attendees), while targeting selected postings to friends that are to be honored at the surprise party (e.g., Surprise Party Honorees) to maintain the integrity of the surprise.

The social circle 220 is a shared private circle, which may also be referred to simply as a shared circle. In general, shared private circles are social circles that the user 202 creates and invites contacts to voluntarily join. Contacts that accept the invitation become members of the shared private circle. Members of a shared private circle can see information posted to that circle by the user 202 and can post information to be shared with other members of the shared private circle. For example, the user 202 may tend to post a large number of jokes to the social network. However, while some of the contacts 204a-204i may find the jokes to be entertaining, others may find them to be simply annoying. Realizing this, the user 202 may create a "jokes" shared private circle and invite some or all of the contacts 204a-204i to join. With the "jokes" social circle in place, the user 202 may post witticisms to the "jokes" circle, and only those contacts who have accepted the invitation are able to see the comicality of the user 202. Similarly, members of the shared private circle are able to post messages to the circle, and those posts are visible to other members of that circle.

The social circle 230 is a shared public circle. In general, shared public circles are social circles that the user 202 creates, and invites contacts to voluntarily join. Further, the existence of a shared public circle is publicly available such that other users of the social networking service (e.g., not necessarily just the user's 202 contacts 204a-204i) may request to join the public social circle. Members of shared public circles may post information to, and see updates posted by, other members of the same public shared circle. In some implementations, public shares circles may be "fan" or "group" circles (e.g., circles dedicated to a particular place, event, product, movie, celebrity, sports team, company, concept, philosophy, organization, support network). For example, the user 202 may create a shared public circle for his band, and fans of his act may join the circle to discuss upcoming shows, download MP3s of the band's music, or post videos from recent concerts. In another example, the user 202 may create a shared public circle for alumni of his high school graduating class, which his former classmates may find and join in order to stay in touch with one another and post pictures from their school days. Once a shared public circle is created, in some implementations the user 202 can invite people to join the circle. In some implementations, nonmembers of the circle can request membership in the shared public circle, and membership in a shared public circle may be automatic upon request, or may require the user's 202 approval to become members of the shared public circle.

In some implementations, one or more default social circles can be provided or suggested to a user when the user subscribes to a social networking service. For example, "Friends," "Family," and "Coworkers" social circles can automatically be provided in a user's profile upon the user subscribing to the particular social networking service. Other social circles can automatically be provided including, for example, an "Acquaintances" social circle and/or a "Just Following" social circle. In some implementations, the automatically created or suggested social circles can include personal social circles. Although default social circles can be automatically provided, it may be left to the user to actually populate the default social circles with contacts. For example, each of the default social circles may initially be empty of contacts, and the user populates each of the default social circles as discussed in further detail herein.

As discussed herein, digital content can be distributed to contacts within the social networking service including one or more social circles, such that they are exclusively viewable by the indicated contacts and/or contacts within one or more indicated social circles. For example, a user of the social networking service can generate an item of digital content, such as a post, and can indicate one or more social circles for distribution of the post. In some implementations, an auto-complete component enables the user to type in part of the name of a social circle and/or individual contact to specify which social circles and/or individual contacts require delivery of the post content. During a post write-time, a post data set is transmitted from the user's client computing device (e.g., client device 102 of FIG. 1) to a distribution hub, which can be provided at a server (e.g., server system 112 of FIG. 1). The post data set includes a plurality of data. In some implementations, the post data set includes post content data (e.g., text, uniform resource indicator (URI)), timestamp data (e.g., a timestamp indicating the time that the post was generated), distribution data (e.g., contacts and/or one or more social circles), and identification (ID) data (e.g., an ID assigned to the post data set upon generation of the post).

In some implementations, and as discussed in further detail herein, other data can be appended to post data sets. Example other data can be spam indication data and scoring data. In some examples, spam indication data can be appended to a post data set to indicate that the post data set is considered to be spam. In some examples, scoring data can include a social affinity score among other possible scoring data.

In some implementations, the scoring data can be recipient specific. In some examples, the scoring data can include social affinity data that is provided based on respective social affinity scores between an author of the post and each recipient of the post. For example, a first user can author a post and define a distribution of the post, creating an underlying post data set. The distribution can include a second user and a third user. A first social affinity score associated with a social relationship between the first user and the second user can be provided, and a second social affinity score associated with a social relationship between the first user and the third user can be provided. The first social affinity score can be different from the second social affinity score, reflecting different social relationships between the first user and the second user and the first user and the third user. The first social affinity score and the second social affinity score can be appended to the post data set and/or stored in another location while maintaining an association with the post data set.

In some implementations, the distribution data is processed to provide an access control list (ACL) that specifies which contacts within the social networking system are granted access to the post content. In some implementations, social affinity scores can also be processed to provide the ACL. For example, the distribution data can indicate that the post content is to be accessible by and/or distributed to a particular user. A social affinity score can be determined for the post and can be specific to a relationship between the post recipient and the author of the post. In some examples, if the social affinity score is below a threshold score, it is determined that the post content will not be accessible by and/or distributed to the particular user. Consequently, although the particular user had been explicitly targeted for distribution of the post by the author, the particular user is not provided in the ACL for the post. In some examples, if the social affinity score is at or above the threshold score, it is determined that the post content will be accessible by and/or distributed to the particular user. Consequently, the particular user had been explicitly targeted for distribution of the post by the author and the particular user is provided in the ACL for the post.

Generally, the distribution hub determines end points the post data set is to be distributed to based on the ACL. More specifically, the set of contacts that may care about the post and/or that are allowed access to the post is determined based on the ACL, and the ID of the post is written to a per user/view index at the distribution hub. When fetching posts to distribute to a user, the user/view index is accessed and the IDs of the various posts that the user is allowed to view are determined. The post data sets are retrieved from a data store (e.g., data store 118 of FIG. 1) and are transmitted to a client device associated with the requesting user. In some implementations, and as discussed in further detail herein, the ACL can be provided based on the overall score, the quality score and/or the social affinity score.

Figure 3:
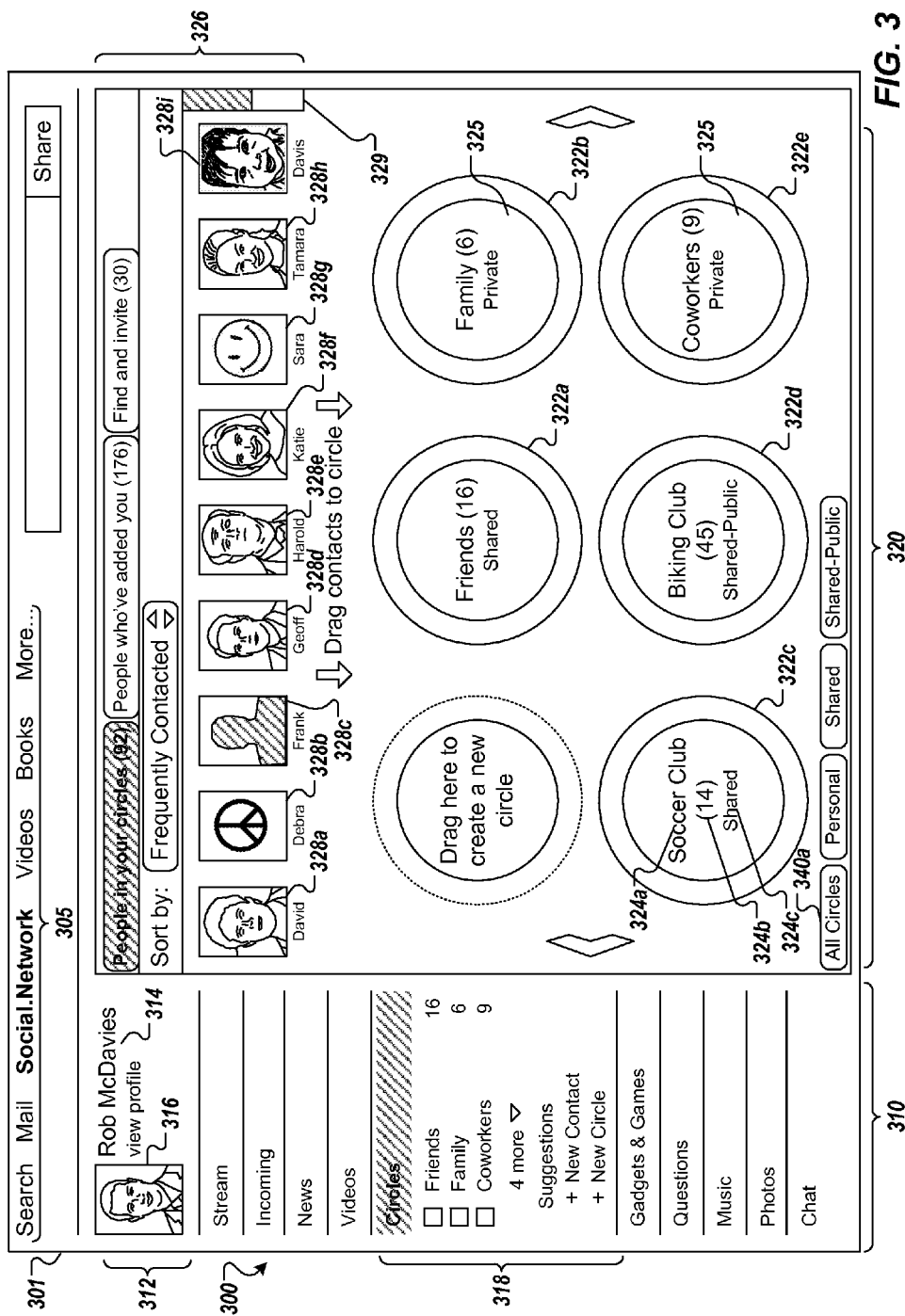
FIG. 3 depicts a screen-shot of example graphical user interface for creating and maintaining social circles.

FIG. 3 depicts a screen-shot 300 of an example graphical user interface for creating and maintaining social circles. In the screen-shot 300, a social graph editor user interface (UI) 301 is shown. In some implementations, the UI 301 can be the interface presented by a purpose made social networking application, while in some implementations the UI 301 can be one or more web pages of a social networking website displayed in a general purpose web browser.

In the example of FIG. 3, the UI 301 includes a number of choices presented in a menu bar 305. In the present example, the "Social Network" choice has been selected by a user. This selection causes a web-based social networking application to be executed and a social network menu 310 to be displayed. The social network menu 310 includes a profile indicator 312 in which information such as a user name 314 and a user image 316 associated with the currently logged in user are displayed.

The social network menu 310 also displays, among other items, a social circles sub-menu 318. The social circles sub-menu 318, when selected (e.g., as represented by the highlighting of the submenu's title), causes a social circle display 320 to be presented. The social circle display 320 includes a number of circles 322a-322e that are visual representations of various social circles that the user has created or has permission to edit. Each of the circles 322a-322e displays information about the social circle it represents. For example, the circle 322c displays a name 324a, a count 324b of the number of contacts associated with the social circle, and an indication 324c of what kind of circle (e.g., personal, private shared, public shared) that the circle 322c is.

The social circle display 320 also includes a contact display 326. The contact display 326 provides a graphical interface for viewing, selecting, and organizing items in the user's contact lists. A collection of contact icons 328a-328i represents the contacts or other entities (e.g., organizations, places, or other items) socially networked with the particular user. In some implementations, the icons can be digital photos of the contacts they represent (e.g., the icons 328a, 328d), arbitrary images (e.g., the icons 328b, 328g), or placeholders (e.g., when the contact has no image associated with their account, such as the icon 328c). In some implementations, the icons can include additional information, such as the names of each contact. A scroll bar 329 is provided for the user to view additional contact icons that may not fit into the initial view.

Figure 4:
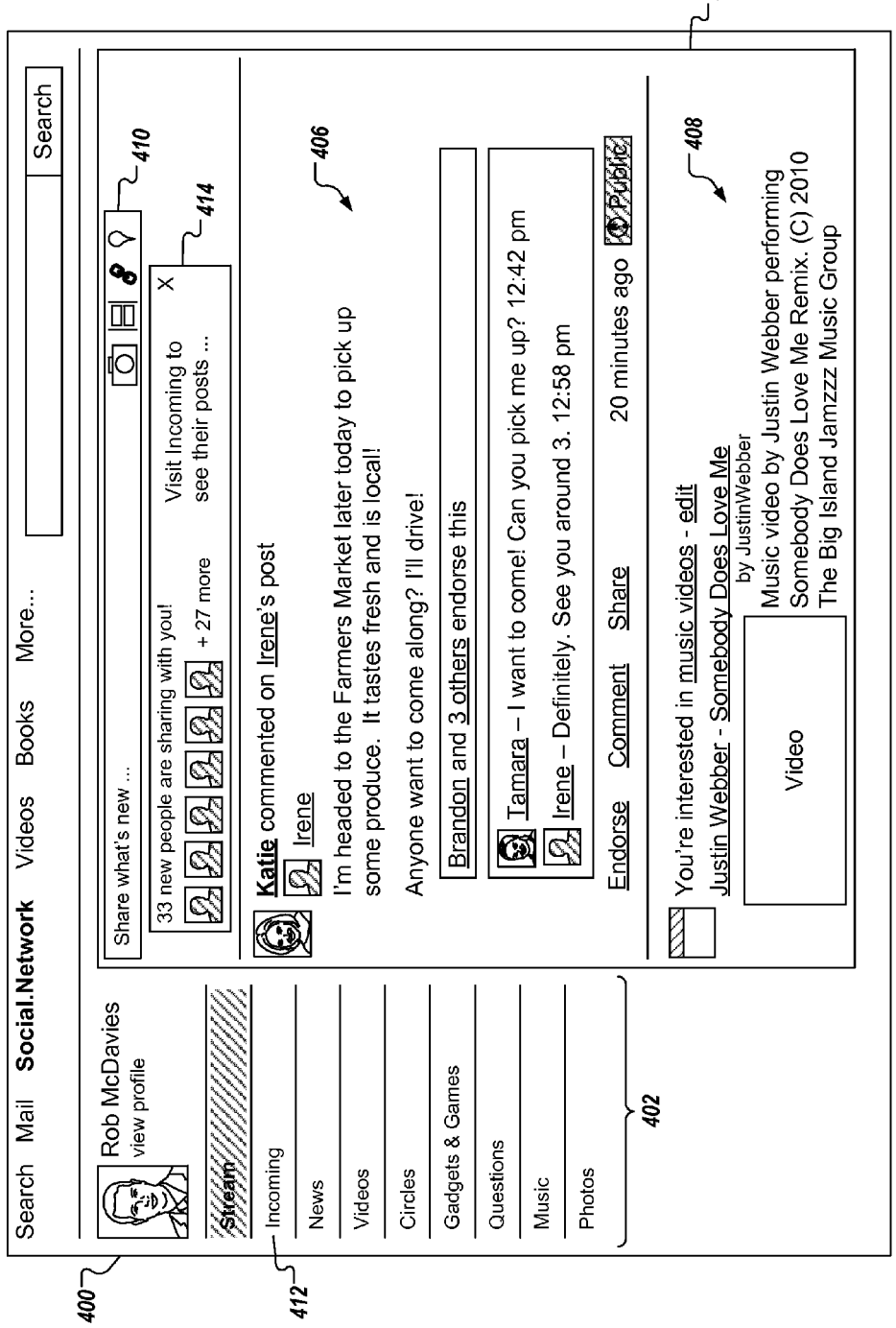
FIG. 4 depicts a screen-shot of an example stream page for a user of a social networking service.

FIG. 4 depicts a screen-shot of an example stream page 400 for a user of a social networking service. For example, the stream page 400 can be provided as a web page within a website of a social networking service, and can display digital content that has been shared with a user associated with the stream page 400. In the illustrated example, the example user includes "Rob McDavies" and the stream page 400 displays items (e.g., digital content) that other users have shared with the user and/or items that the user has shared with other users. The stream page 400 includes a social network menu 402 and an item region 404. Example items 406, 408 that have been distributed to the user are displayed in the item region 404. Generally, the items 406, 408 displayed in the item region 404 include digital content that is distributed to the user from contacts established within the social networking service. A content sharing interface 410 can also be provided in the item region 404. The user can activate (e.g., click on) the content sharing interface 410 to share digital content. Although two items 406, 408 are depicted in FIG. 4, it is appreciated that the stream page 400 can display any number of items to the user.

Data associated with the item can be stored in an item repository (e.g., a database) and the data can be periodically updated. In some examples, the data is updated in response to the occurrence of an event to the item. For example, a user can interact with the item (e.g., endorse, comment on, share). The data associated with the item can be retrieved for ranking and ordering of the item within a stream page of a user, as discussed in further detail herein.

In some implementations, the item score (S) associated with a particular item reflects a relevance of the item to a particular user. In some implementations, the item score (S) is determined based on item data (ID) and log data (LD). The item data and the log data each include (or are associated with) a listing of item features (f) of the items. In some examples, each of the features has an associated value (e.g., a feature value). In some examples, the feature values can be normalized (e.g., normalized between zero and one).

In some examples, the item data (ID) includes a list of features (f) of one or more items (e.g., items 406, 408) that are item-dependent (e.g., "item-dependent features") or user dependent (e.g., "user-dependent features"). The item-dependent features include features relating to (or associated with) the content of the items. For example, each item includes content, such as, text, images, video, audio, and/or hyperlinks. Features related to such content can be identified (or determined). Such features can include specific words in the items, specific word pairs in the items, and/or topics of the items. In some examples, user-dependent features are dependent on the specific user (e.g., the user-dependent features are evaluated from the perspective of the specific user that is accessing the item). In some implementations, the user-dependent features can include features based on a type of relationship between the specific user and an author of the item. For example, the type of relationships can include a symmetric relationship and an asymmetric relationship. In some examples, symmetric relationships include that the specific user and the author of the item being mutually socially connected (e.g., the user and the author are both members of respective social circles; the user and the author "follow" each other; the user and the author are "friends). In some examples, the asymmetric relationships include that the specific user and the author of the item are not mutually connected, but rather only one of the user and the author of the item is socially connected to the other of the user and the author of the item (e.g., the user is a member of the author's social circle, but the author is not a member of the user's social circle (or vice versa); the user "follows" the author, but the author does not "follow" the user (or vice versa)). In some examples, the feature relating to asymmetric relationships can have the feature value of zero and the feature relating to symmetric relationships can have the feature value of one.

In some implementations, user-dependent features can include features based on a social affinity between the user that may be receiving the item in a stream page (e.g., the stream page 400) and the author of the item. In some examples, the item features relating to the social affinity can each be associated with a value (e.g., feature value or social affinity value). In some implementations, the user-dependent features are based on social affinities between the user and other users to which the item was also distributed and that may have interacted with the item (e.g., commented on the item, endorsed the item, shared the item). In some examples, a particular social affinity value between two users (e.g. a particular user and an author of a post) can be based on the number of users the two users are both socially connected (asymmetrically or symmetrically). In some examples, a particular social affinity value between two users (e.g. a particular user and an author of a post) can be based on, of the users that are socially connected (symmetrically) to the two users, the number of users that are socially connected to each other (either asymmetrically or symmetrically).

In some examples, a particular social affinity value can be provided as a sum of other social affinity values. For example, the particular social affinity value can be provided as the sum of other social affinity values reflecting a social affinity of the user and the author user and a plurality of social affinity values reflecting respective social affinities between the user and other users that have interacted with the item.

In some examples, a social affinity feature is based on the type of computer-implemented interactive service between the user and the author. In some examples, a social affinity feature is based a subset of (or each) computer-implemented interactive services. In some examples, one or more social affinity features are based on each of the computer-implemented interactive services. In some examples, the computer-implemented interactive services can include electronic message interactions, chat interactions, and social networking service interactions. In some examples, the social networking service interactions can include viewing, commenting, sharing, and/or endorsing items (e.g., an item associated with another user) by the particular user.

To illustrate a particular social affinity feature (e.g., features based on a social affinity between two users) and associated value, and by way of example, an author distributes a first item and a second item. The first item is distributed to a first set of users including the particular user. The second item is distributed to a second set of users also including the particular user. The particular user is a direct contact of each of the other users within the first set of users. The particular user is not a direct contact of any of the other users within the second set of users. A first social affinity value is provided for the first item and a second social affinity value is provided for the second item. The first social affinity value and the second social affinity value are each specific to the particular user. The first social affinity value is determined based on a social affinity between the particular user and the author and respective social affinities between the particular user and each of the other users in the first set of users. The second social affinity value is determined based on the social affinity between the particular user and the author and respective social affinities between the particular user and each of the other users in the second set of users. The first social affinity value is greater than the second social affinity value because the particular user has higher social affinities to the other users in the first set of users than to the other users in the second set of users, the particular user being a direct contact of each of the other users in the first set of user.

In some implementations, the item data can further include a listing of features relating to other (e.g., miscellaneous) aspects of the item. The other (e.g., miscellaneous) aspects of the item can include features relating to whether the item has emoticons (and/or the number of emoticons, and the type of emoticons); the length of the item (e.g., the number of characters of the item); whether the item includes a video and/or image; the total number of comments/reshares associated with the item; and the number of comments associated with the item in view of the total number of users providing the comments (e.g., the number of comments per user).

The log data (LD) includes a listing of features (f) of one or more items (e.g., items 406, 408) based on data across all users (or a subset of the users) of the social networking service. The log data can include interaction data of the items of the social networking service by the users. In some examples, the features associated with the log data can be associated with a value (e.g., feature value) based on the interaction data. In some examples, the interaction data can be based on a per-item basis (e.g., interactions with a specific item) and/or based on a per-user basis (e.g., interactions by the user with multiple items). The interactions can include viewing an item, commenting on an item, sharing an item, and/or endorsing an item. For example, for each item, the log data can include the number of times the item was viewed by users (of the social networking service) and an indication of which users viewed the item, the number of times the item was shared by users and an indication of which users shared the item, the number of comments on the item and which users commented on the item, and the number of endorsements the item has received and an indication of which users endorsed the item. As another example, for each user, the log data can include items the user has viewed, items the user has shared, items the user has commented on and items the user has endorsed.

In some examples, a feature (and associated feature value) of the item is based on a number of events to the item and the type of events. In some examples, negative events can also be considered in determining the associated feature value. An example negative event can include one or more users muting the particular item, such that the item is no longer displayed in their respective stream pages. In some examples, a feature (and associated feature value) can be provided as a sum of a number of comments to the item, a number of endorsements of the item, a number of shares of the item and a number of mutes of the item. In some examples, respective weights can be applied to define an influence that each of the number of comments to the item, the number of endorsements of the item, the number of shares of the item and the number of mutes of the item has on the value of the content score. In some examples, a feature (and associated feature value) of the time is based on an amount of content of the item.

Figure 5:
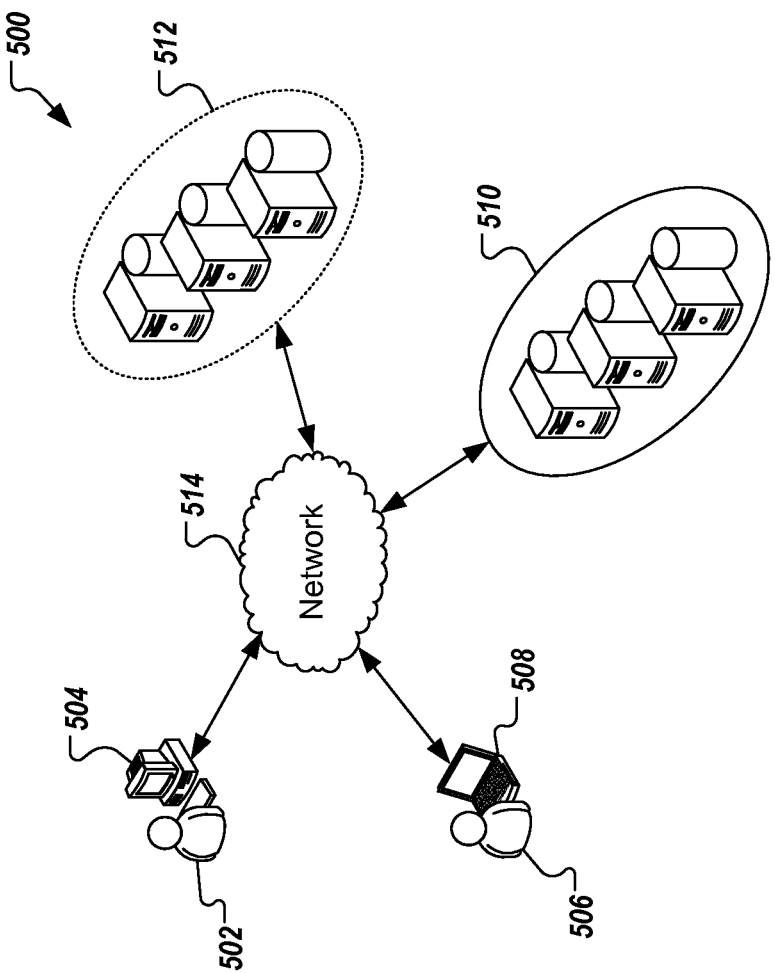
FIG. 5 depicts an example system for determining an item score of items displayed in a stream page.

FIG. 5 depicts an example system 500 for ranking and ordering items displayed in a stream page. The example system 500 includes a first user 502 interacting with a first computing device 504, a second user 506 interacting with a second computing device 508, a first server system 510, a second server system 512 and a network 514. The first computing device 504, the second computing device 508, the first server system 510 and the second server system 512 can communicate with one another over the network 514.

In some implementations, a social networking service is provided and can be executed using the first and second server systems 510, 512. In some examples, the first server system 510 can receive, store and distribute items posted to the social networking service by users of the social networking service (e.g., the first user 502 and the second user 506). In some examples, the first server system 510 can monitor occurrences of events (e.g., item generation/distribution, comments, endorsements, sharing) and can determine which users are to receive the event (e.g., which users to deliver an item to). The first server system 510 can provide event data to the second server system. In some examples, the second server system 512 provides a scoring service. The scoring service can determine the scores discussed herein and can provide the scores to the first server system 510 for item ranking and ordering.

In some implementations, the users of the social networking service (e.g., the first user 502 and the second user 506) can be categorized (or grouped) into one or more groups ($G_1$, $G_2$, ..., $G_n$). In general, the groups can represent differing classes of user interaction with items (e.g., stream items 406, 408) displayed in the stream page (e.g., stream page 400). More plainly stated, each group can reflect a type of user. For example, a first group can reflect users that typically view and/or interact with items that are distributed by other users that are known to the user. A second group can reflect users that typically view and/or interact with items that include particular content (e.g., images, videos, hyperlinks). A third group can reflect users that typically view and/or interact with items that are distributed by other users that are deemed to be popular users (e.g., a well known actor, artist, musician, politician). As discussed in further detail below, a group reflects a respective type of user based on a set of weights defined for the group.

For purposes of illustrations, the present disclosure discusses three groups ($G_1$, $G_2$, $G_3$) to which the user can associated with. However, it is appreciated that fewer or more groups can be provided (for example, the number of groups can be based upon the specific implementation of the grouping of the users).

For a particular user, the user has an associated probability (P) of belonging to (or being associated with) one or more groups (e.g., one or more probabilities of attributing the user to one or more groups, respectively). Continuing the example above, three probabilities $P_{G1}$, $P_{G2}$, $P_{G3}$ can be provided for attributing the particular user to the groups $G_1$, $G_2$, and $G_3$, respectively. In some implementations, the sum of the probabilities (e.g., $P_{G1}$, $P_{G2}$, $P_{G3}$) is equal to one (e.g., $P_{G1}+P_{G2}+P_{G3}=1$). In some examples, the initial values of the probabilities ($P_{G1}$, $P_{G2}$, $P_{G3}$) can be determined based on log data (e.g., limited log data) associated with the specific user. For example, and based on log data, it can be determined that the user often interacts with items distributed by other users that are known to the user, sometimes interacts with items that include particular content (e.g., images, videos, hyperlinks), and rarely interacts with items that are distributed by other users that are deemed to be popular users. Consequently, the probabilities can be provided such that $P_{G1}>P_{G2}>P_{G3}$.

As described above, each item (e.g., stream items 406, 408) is associated with (or includes) one or more features ($f_A$, $f_B$, ..., $f_i$) ("item features"). The item features can include user-dependent features, for example, features based on social features of the item (e.g., number of communications between the particular user and the user associated with the item); item-dependent features, for example, features based on topic(s) associated with the item; and also miscellaneous features, e.g., a total number of comments and reshares of the item across a sub-portion (or all) users of the social networking service.

With respect to the features, each group ($G_1$, $G_2$, ..., $G_n$) can include a respective set of weights, where each weight (w)

is associated with a particular item feature. For example, for item features $f_A$, $f_B$, and $f_C$ (of any particular item), the associated weights of the item features with respect to a first group ($G_1$) include weight $w_{A,G1}$ (i.e., the weight of feature $f_A$ with respect to the first group $G_1$), weight $w_{B,G1}$ (i.e., the weight of feature $f_B$ with respect to the first group $G_1$), and weight $w_{C,G1}$ (i.e., the weight of feature $f_C$ with respect to the first group $G_1$). Continuing the example, the associated weights of the features with respect to a second group ($G_2$) include weight $w_{A,G2}$ (i.e., the weight of feature $f_A$ with respect to the second group $G_2$), weight $w_{B,G2}$ (i.e., the weight of feature $f_B$ with respect to the second group $G_2$), and weight $w_{C,G2}$ (i.e., the weight of feature $f_C$ with respect to the second group $G_2$).

In some examples, values of the respective weights enable a particular group to reflect a respective type of user. For example, a first group can reflect users that typically view and/or interact with items that are distributed by other users that are known to the user by providing a set of weights that more heavily weight certain user-dependent features (e.g., author) than other features. As another example, a second group can reflect users that typically view and/or interact with items that include particular content (e.g., images, videos, hyperlinks) by providing a set of weights that more heavily weight certain item-dependent features (e.g., whether the item includes images, videos, hyperlinks) than other features.

In some implementations, the specific weights that are associated with each group can be initially arbitrarily defined, or initially user-defined. In some implementations, the specific weights that are associated with each group can be based on machine learning. For example, based on the log data (e.g., interaction data of the items by the user), a machine learning system (not shown) can define (initially or continuously) the specific weights that are associated with each group. Furthermore, as additional log data is generated (e.g., as more users of the social networking service interact with more items), the machine learning system (not shown) can adjust the specific weights that are associated with each group, either at pre-defined intervals, or continuously. Thus, the definition of the groups (i.e., the weights associated with each group) can change over time (i.e., the groups are dynamic). In some examples, the specific weights that are associated with each group are static. For example, the specific weights continue their respective values after being initially defined, or after a predefined event period (e.g., after a time period (2 months) or a predefined amount of log data is accumulated)

Table 1 depicts an example matrix displaying the weights (w) associated with each group (G) that are associated with each item feature (f) (e.g., the weight for each group and each item feature).

TABLE 1

Group-dependent Item Feature Weights

| Item Features | $G_1$ | $G_2$ | ... | $G_n$ |
|---|---|---|---|---|
| $f_A$ | $w_{A,G1}$ | $w_{A,G2}$ | ... | $w_{A,Gn}$ |
| $f_B$ | $w_{B,G1}$ | $w_{B,G2}$ | ... | $w_{B,Gn}$ |
| $f_C$ | $w_{C,G1}$ | $w_{C,G2}$ | ... | $w_{C,Gn}$ |
| $f_D$ | $w_{D,G1}$ | $w_{D,G2}$ | ... | $w_{D,Gn}$ |
| $f_E$ | $w_{E,G1}$ | $w_{E,G2}$ | ... | $w_{E,Gn}$ |
| $f_F$ | $w_{F,G1}$ | $w_{F,G2}$ | ... | $w_{F,Gn}$ |
| $f_G$ | $w_{G,G1}$ | $w_{G,G2}$ | ... | $w_{G,Gn}$ |
| ... | ... | ... | ... | ... |
| $f_i$ | $w_{i,G1}$ | $w_{i,G2}$ | ... | $w_{i,G1}$ |

To that end, each item feature ($f_A$, $f_B$, ..., $f_i$) of each item ($I_1$, $I_2$, ..., $I_m$) is associated with a value (v). Specifically, the value is a measure of the specific item feature (e.g., user-dependent features, item-dependent features, and/or miscellaneous features) with respect to a particular item (e.g., items 406, 408). For example, for a first item $I_1$, the value of the item feature $f_A$ (e.g., a number of chats between the user and the author of the first item $I_1$) is provided as $v_{A,I1}$ (e.g., 10 chats). Continuing the example, for a second item $I_2$, the value of the item feature $f_A$ (e.g., number of chats between the user and the author of the first item $I_2$) is provided as $v_{A,I2}$ (e.g., 15 chats). Thus, each item can be associated with values based on the features of the item. For example, item $I_m$ can be associated with values $v_{A,Im}$, $v_{B,Im}$, $v_{C,Im}$, ... $v_{i,Im}$.

A score of an item with respect to the particular user (e.g., a user specific score of an item or user-dependent item score) is determined. For example, when providing the stream page 400 and the ranking of the items 406, 408 within the stream page 400, the score of the items are determined, such as to rank the items 406, 408 in the stream page 400 for the first user 502 or the second user 506. In summary, in some implementations, determining the score of the item includes, at least, for each group, determining the weighted value of each item feature of an item for a specific user (e.g., "weighted values"); for each group, the weighted values (of the item features) are summed (e.g., "summed weighted values"); for each group, the summed weighted values are scaled (e.g., multiplied) with a probability that the user is associated with the group (e.g., "weighted sum probabilities"); and summing the weighted sum probabilities to provide the item score (e.g., user-dependent item score).

Specifically, for each group, the weighted value of each item feature of the item is determined for a specific user (e.g., the "weighted values"). In other words, the values ($v_{A,Im}$, $v_{B,Im}$, $v_{C,Im}$, $v_{i,Im}$) of each item feature ($f_A$, $f_B$, ..., $f_i$) for each item (associated with a specific user ($U_1$)) are weighted for each group ($G_1$, $G_2$, $G_3$). For example, for each group $G_1$, $G_2$, $G_3$, for item $I_1$ (associated with user $U_1$) having item features $f_A$, $f_B$, ..., $f_i$, the associated weight (w) is identified for each item feature $f_A$, $f_B$, ..., $f_i$. For example, for group $G_1$, the weights $w_{A,G1}$, $w_{B,G1}$, and $w_{C,G1}$ are identified for item features $f_A$, $f_B$, ..., $f_i$ of item $I_1$, respectively. In some examples, the item features $f_A$, $f_B$, ..., $f_i$ (of item $I_1$) are weighted for the group $G_1$ by scaling (e.g., multiplying) the values ($v_{A,Im}$, $v_{B,Im}$, $v_{C,Im}$, ... $v_{i,Im}$) associated with each of the item features $f_A$, $f_B$, ..., $f_i$ by the respective weights $w_{A,G1}$, $w_{B,G1}$, ..., $w_{i,G1}$. Continuing the example, for the group $G_1$, the weighted values for each item feature of item $I_1$ are ($w_{A,G1})(v_{A,I1})$, ($w_{B,G1})(v_{B,I1})$, ..., ($w_{i,G1})(v_{i,I1})$. In some examples, the weighted values of each item feature of the item $I_1$ (associated with the user $U_1$) are determined for each remaining group (e.g., groups $G_2$ and $G_3$). Thus, for the group $G_2$, the weighted values for each item feature of the item $I_1$ are ($w_{A,G2})(v_{A,I1})$, ($w_{B,G2})(v_{B,I1})$, ..., ($w_{i,G2})(v_{i,I1})$; and for the group $G_3$, the weighted values for each item feature of the item $I_1$ are ($w_{A,G3})(v_{A,I1})$, ($w_{B,G3})(v_{B,I1})$, ..., ($w_{i,G3})(v_{i,I1})$.

In some examples, for each group, the weighted values for each item feature of the item are summed (e.g., the "summed weighted values"). For example, for group $G_1$, the weighted values $[(w_{A,G1})(v_{A,I1}), (w_{B,G1,I1})(v_B), \ldots, (w_{i,G1})(v_{i,I1})]$ for the item $I_1$ are summed. Thus, the summed weighted values (e.g., "swv") of the item $I_1$ for the user $U_1$ and the group $G_1$ can be determined based on the following example relationship:

$$swv_{I1,U1,G1} = (w_{A,G1})(v_{A,I1}) + (w_{B,G1,})(v_{B,I1}) + \ldots + (w_{i,G1})(v_{i,I1})$$

Similarly, for groups $G_2$ and $G_3$, the summed weighted values (e.g., "swv") of the item $I_1$ for the user $U_1$ can be determined based on the follow relationships, respectively:

$$swv_{I1,u1,G2} = (w_{A,G2})(v_{A,I1}) + (w_{B,G2})(v_{B,I1}) + \ldots + (w_{i,G2})(v_{i,I1})$$

$$swv_{I1,u1,G3} = (w_{A,G3})(v_{A,I1}) + (w_{B,G3})(v_{B,I1}) + \ldots + (w_{i,G3})(v_{i,I1})$$

In some examples, for each group, the summed weighted values (e.g., "swv") are scaled with (e.g., multiplied by) the probability that the specific user is associated with the specific group (e.g., the "weighted sum probability"). Specifically, the summed weighted values (e.g., "swv") can be multiplied with the probability (P) that the specific user $U_I$ is associated with each group ($G_1$, $G_2$, $G_3$). For example, for group $G_1$, the summed weighted values of the item $I_1$ for the user $U_1$ ($swv_{I1, U1, G1}$) are multiplied by the probability ($P_{u1,G1}$). Thus, for group $G_1$, the weighted sum probability (e.g., "wsp") of the item $I_1$ for the user $U_1$ can be determined based on the following example relationship:

$$wsp_{I1,u1,G1} = P_{u1,G1} \times swv_{I1, U1, G1}.$$

Similarly, the groups $G_2$ and $G_3$ have associated probabilities are $P_{u1,G2}$ and $P_{u1,G3}$, respectively (e.g., the probability that the user $U_1$ is associated with groups $G_2$ and $G_3$, respectively). Thus, the weighted sum probabilities (e.g., "wsp") of the item $I_1$ for the user $U_1$ and each of the groups $G_1$ and $G_2$ can be determined based on the following example relationships, respectively:

$$wsp_{I1,u1,G2} = P_{u1,G2} \times swv_{I1,u1,G2}; \text{ and}$$

$$wsp_{I1,u1,G3} = P_{u1,G3} \times swv_{I1,u1,G3}.$$

In some examples, the weighted summed probabilities (e.g., "wsp") are summed to provide the user-specific score of the item with respect to the particular user (i.e., a user specific score of an item or an user-dependent item score). Specifically, the weighted sum probabilities (e.g., "wsp") are summed to provide the score of the item $I_1$ with respect to the user $U_1$ ($s_{I1,u1}$). For examples, for the item $I_1$ and the user $U_1$, the weight sum probabilities ($wsp_{I1,u1,G1}$, $wsp_{I1,u1,G2}$, $wsp_{I1,u1,G3}$) of each group ($G_1$, $G_2$, $G_3$) are summed. Thus, the item score of the item $I_1$ for the user $U_1$ can be determined based on the following example relationship:

$$S_{I1,u1} = wsp_{I1,u1,G1} + wsp_{I1,u1,G2} + wsp_{I1,u1,G3}.$$

In some implementations, the item score (for each user) can be normalized for each item. For example, the item score can be normalized to be within the range of zero to one.

Figure 6A:
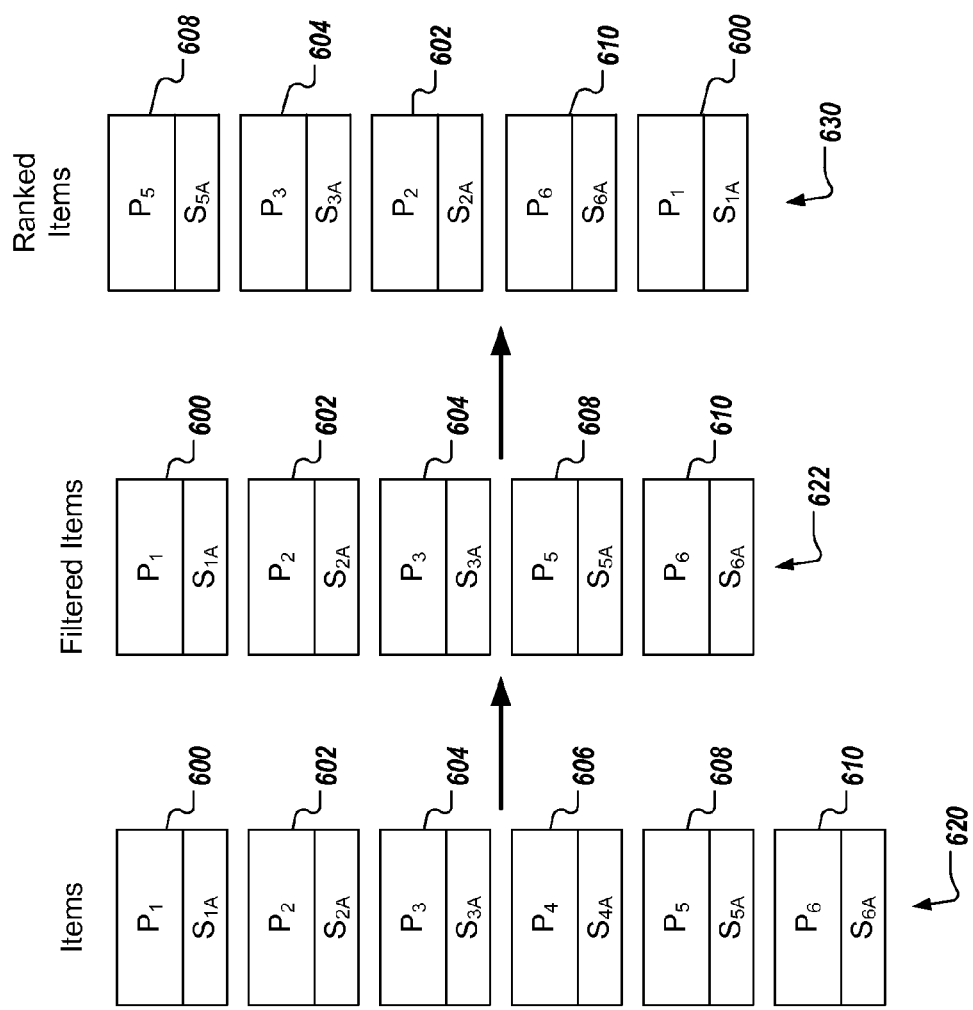
FIG. 6A depicts example ranking and ordering of example items in a stream page for a first user.

FIG. 6A depicts example ranking and ordering of example items in a stream page for a first user (e.g., the first user 502 of FIG. 5). FIG. 6A includes example items 600, 602, 604, 606, 608, 610. Each item 600, 602, 604, 606, 608, 610 includes digital content data ($P_1$, $P_2$, $P_3$, $P_4$, $P_5$, $P_6$, respectively), and an item score ($S_{1A}$, $S_{2A}$, $S_{3A}$, $S_{4A}$, $S_{5A}$, $S_{6A}$, respectively). In some examples, the item scores are determined as described above. The item scores are specific to the first user (e.g., User A). The item information can be provided in an index of items that is specific to the first user. In some examples, the item scores are dynamic in that each item score can change based on events and social relationships between the first user and other users (e.g., item author users) over time, as discussed herein. In some implementations, current item score are retrieved in response to a request to display items to the user (e.g., when the user logs into the social networking service, when the user clicks on the stream page, when the user refreshes the stream page, when the stream page is automatically refreshed). In some implementations, the item score are periodically updated. In some implementations, data stored in the index of items is automatically updated when an item score changes.

With continued reference to FIG. 6A, an initial collection of items 620 is provided. The initial collection of items 620 includes all items 600, 602, 604, 606, 608, 610. In some examples, the items can be filtered based on then item score. For example, each item score can be compared to a threshold item score and any items having an item score that is less than the threshold item score is filtered. In the example of FIG. 6A, the item 606 is filtered. Consequently, the filtered items include items 600, 602, 604, 608, 610.

The filter items 622 are ranked based on the item score within the groups to provide ranked items 624. In the depicted example, $S_{5A}$ is greater than $S_{3A}$ which is greater than $S_{2A}$. Consequently, item 608 is ranked higher than item 604 and item 604 is ranked higher than item 602. In the depicted example, $S_{6A}$ is greater than $S_{1A}$. Consequently, item 610 is ranked higher than item 600. Accordingly, when the first user accesses the stream page the items will be displayed in the following order from top to bottom: item 608, item 604, item 602, item 610 and item 600. This order is specific to the first user, as illustrated further below.

Figure 6B:
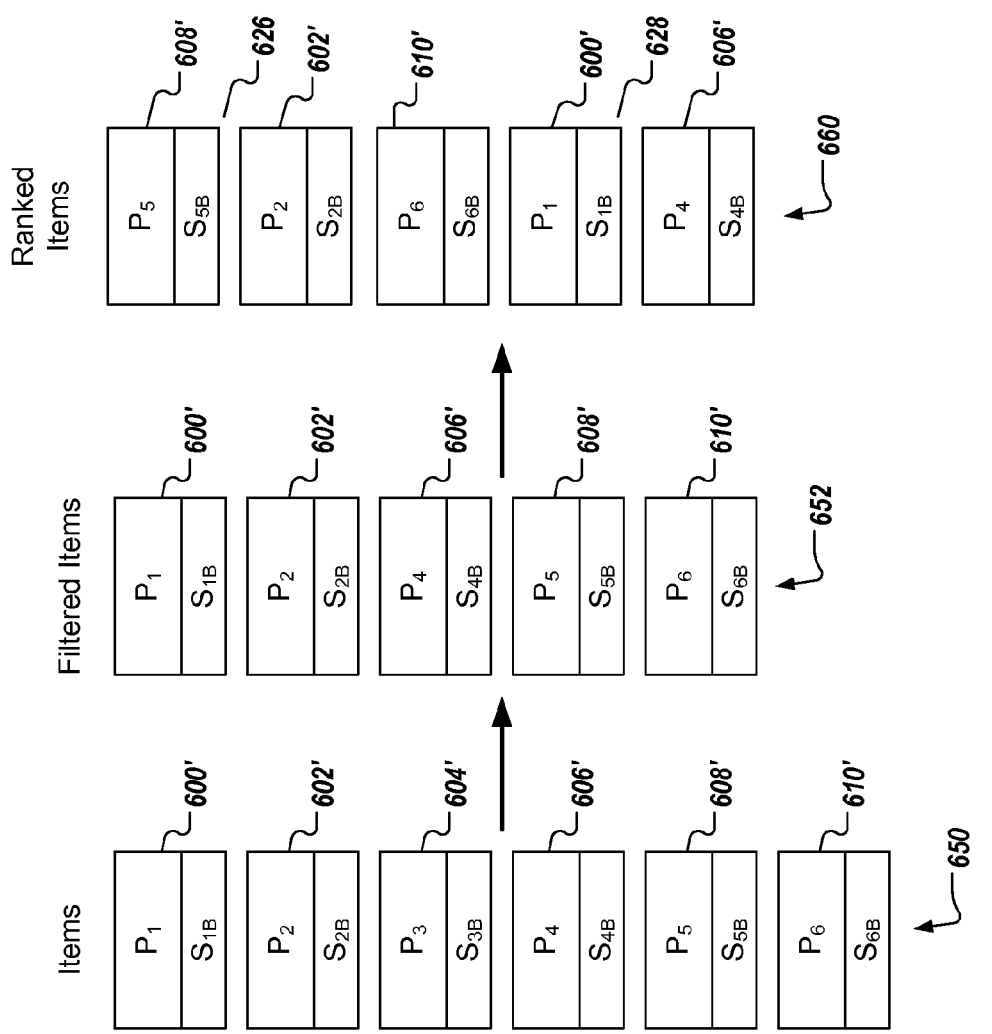
FIG. 6B depicts example ranking and ordering of the example items of FIG. 6A in a stream page for a second user.

FIG. 6B depicts example ranking and ordering of the example items of FIG. 6A in a stream page for a second user (e.g., the second user 506 of FIG. 5). FIG. 6B includes the example items 600', 602', 604', 606', 608', 610' of FIG. 6A. Each item 600', 602', 604', 606', 608', 610' includes the digital content data ($P_1$, $P_2$, $P_3$, $P_4$, $P_5$, $P_6$, respectively), and an item score ($S_{1B}$, $S_{2B}$, $S_{3B}$, $S_{4B}$, $S_{5B}$, $S_{6B}$, respectively). The item scores are specific to the second user (e.g., User B). The item information can be provided in an index of items that is specific to the second user. In some examples, the item scores are dynamic in that each item score can change based on events and social relationships between the second user and other users (e.g., item author users) over time, as discussed herein. In some implementations, current item score are retrieved in response to a request to display items to the second user (e.g., when the user logs into the social networking service, when the user clicks on the stream page, when the user refreshes the stream page, when the stream page is automatically refreshed). In some implementations, the item score are periodically updated. In some implementations, data stored in the index of items is automatically updated when an item score changes.

With continued reference to FIG. 6B, an initial collection of items 650 is provided. The initial collection of items 650 includes all items 600', 602', 604', 606', 608', 610'. Accordingly, the initial collection of items 650 for the second user corresponds to the initial collection of items 630 of the first used. This can occur, for example, if authors of the items distribute the items to both the first user and the second user. In some implementations, the items are filtered to provide filtered items 652, as discussed above. In the example of FIG. 6B, the item 604 is filtered. Consequently, the filtered items include items 600', 602', 606', 608', 610'.

The filtered items 652 are ranked based on item score to provide ranked items 660. In the depicted example, $S_{5B}$ is greater than $S_{2B}$. Consequently, item 608' is ranked higher than item 602'. In the depicted example, $S_{6B}$ is greater than $S_{1B}$ which is greater than $S_{4B}$. Consequently, item 610' is ranked higher than item 600' and item 606'. Accordingly, when the second user accesses the stream page the items will be displayed in the following order from top to bottom: item 608, item 602, item 610, item 600 and item 606. This order is specific to the second user, as illustrated by comparing the order provided for the first user above.

In some implementations, dynamic ranking and ordering of items displayed to a user can be provided. Generally, item scores can be updated in real-time (e.g., without user intervention) to dynamically update the groups and order within groups. In this manner, events occurring to items and/or author users, for example, can be dynamically considered and the ranking and ordering of items can be updated in real-time.

Figure 7:
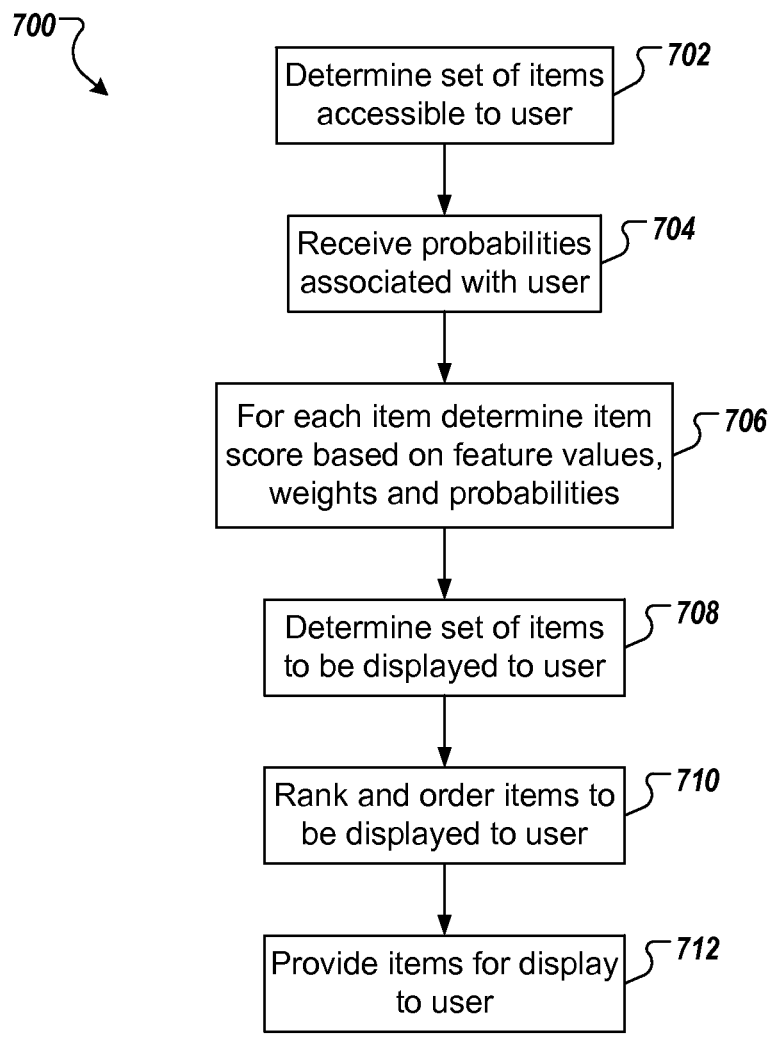
FIG. 7 is a flowchart of an example process that can be executed in implementations of the present disclosure.

FIG. 7 is a flowchart of an example process 700 that can be executed in implementations of the present disclosure. In some implementations, the example process 700 can include operations that are performed using one or more computer programs executed using one or more data processing apparatus (e.g., one or more client-side computing devices and/or one or more server-side computing devices).

A set of items that could be displayed to a user is determined (702). For example, the user can log into a social networking service and a user-specific index of items can provide the set of items that could be displayed to the user. Probabilities associated with the user are received (704). For example, the probabilities can be received from a database of probabilities, each probability indicating a likelihood that the user is a type of user reflected by a respective group.

For each item in the set of items, an item score is determined based on feature values, weights and probabilities (706). For example, determining the item score can include, for each item, determining a plurality of item sub-scores, each item sub-score being based on a group and being determined based on the plurality of feature values and a set of weights provided for the group, and, for each item, determining the item score based on the plurality of item sub-scores and the probabilities. In some examples, determining the item score based on the plurality of item sub-scores and the probabilities includes multiplying each sub-item score by a respective probability. As another example, determining the item score includes, for each item, selecting a group based on the probabilities, the item score being determined based on a set of weights associated with the group. In some examples, selecting a group based on the probabilities includes selecting the group having a highest probability.

A set of items to be displayed to the user is determined (708). In some examples, the set of items to be displayed is a sub-set of the set of items that could be displayed to the user. In some examples, the set of items to be displayed is determined based on the item scores. Items in the set of items to be displayed are ranked and ordered (710). For example, the items in the set of items to be displayed can be ranked and ordered based on the item scores. Items on the set of items are provided for display (712).

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the invention can be realized as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclose can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the invention can be realized in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results.

The invention claimed is:

1. A system comprising:
   a computing device; and
   a computer-readable medium coupled to the computing device and having instructions stored thereon which, when executed by the computing device, cause the computing device to perform operations comprising:
   identifying a set of items that are displayed to a user of a social networking service, one or more items of the set of items comprising digital content distributed using the social networking service and being associated with a plurality of item features, the plurality of item features comprising item-dependent features and user-dependent features;
   for one or more items in the set of items, receiving a plurality of feature values, each of the feature values for each item of the one or more items being associated with one of an item-dependent feature and a user-dependent feature;
   receiving a plurality of probabilities, each of the probabilities of the plurality of probabilities being associated with a group of a plurality of groups and reflecting a likelihood that the user is a type of user associated with the group, each group of the plurality of groups including a set of weights, wherein each weight of each group is associated with an item feature of the one or more items;
   for one or more items in the set of items, determining an item score for the item based on i) for each group, a weighted feature value associated with each item feature of the item for the group and ii) the probability associated with each group, wherein the weighted feature value for each item feature for each group is based on i) the feature value of the item feature and ii) the weight associated with the item feature for the group; and
   determining a subset of items to be displayed to the user based on the item scores for each of the one or more items, the subset of items comprising items of the plurality of items.

2. The system of claim 1, wherein the weighted feature value for each item feature for each group is based on a product of i) the feature value of the item feature and ii) the weight associated with the item feature for the group.

3. The system of claim 1, wherein the probabilities in the plurality of probabilities vary based on activity of the user within the social networking service.

4. The system of claim 1, wherein determining the item score comprises selecting a group based on the plurality of probabilities, the item score being determined based on the set of weights associated with the group.

5. The system of claim 4, wherein selecting a group based on the plurality of probabilities comprises selecting the group having a highest probability.

6. The system of claim 1, wherein the operations further comprise transmitting instructions to display items in the subset of items to the user.

7. The system of claim 6, wherein the operations further comprise determining a rank order based on the items scores for each of the one or more items in the subset of items, the items of the subset of items being displayed based on the rank order.

8. The system of claim 1, wherein each user-dependent feature includes a feature value that varies between a plurality of users.

9. The system of claim 1, wherein each item-dependent feature includes a feature value that is static between a plurality of users.

10. The system of claim 1, wherein the set of weights of at least one group of the plurality of groups varies based on an activity of one or more users of the social networking service.

11. A non-transitory computer storage media encoded with one or more computer programs, the one or more computer programs comprising instructions that when executed by data processing apparatus cause the data processing apparatus to perform operations comprising:
   identifying a set of items that are displayed to a user of a social networking service, one or more items of the set of items comprising digital content distributed using the social networking service and being associated with a plurality of item features, the plurality of item features comprising item-dependent features and user-dependent features;

for one or more items in the set of items, receiving a plurality of feature values, each of the feature values for each item of the one or more items being associated with one of an item-dependent feature and a user-dependent feature;

receiving a plurality of probabilities, each of the probabilities of the plurality of probabilities being associated with a group of a plurality of groups and reflecting a likelihood that the user is a type of user associated with the group, each group of the plurality of groups including a set of weights, wherein each weight of each group is associated with an item feature of the one or more items;

for one or more items in the set of items, determining an item score for the item based on i) for each group, a weighted feature value associated with each item feature of the item for the group and ii) the probability associated with each group, wherein the weighted feature value for each item feature for each group is based on i) the feature value of the item feature and ii) the weight associated with the item feature for the group; and determining a subset of items to be displayed to the user based on the item scores for each of the one or more items, the subset of items comprising items of the plurality of items.

12. The computer storage media of claim 11, wherein the weighted feature value for each item feature for each group is based on a product of i) the feature value of the item feature and ii) the weight associated with the item feature for the group.

13. The computer storage media of claim 11, wherein the probabilities in the plurality of probabilities vary based on activity of the user within the social networking service.

14. The computer storage media of claim 11, wherein determining the item score comprises selecting a group based on the plurality of probabilities, the item score being determined based on the set of weights associated with the group.

15. The computer storage media of claim 14, wherein selecting a group based on the plurality of probabilities comprises selecting the group having a highest probability.

16. The computer storage media of claim 11, wherein the operations further comprise transmitting instructions to display items in the subset of items to the user.

17. The computer storage media of claim 16, wherein the operations further comprise determining a rank order based on the items scores for each of the one or more items in the subset of items, the items of the subset of items being displayed based on the rank order.

18. The computer storage media of claim 11, wherein each user-dependent feature includes a feature value that varies between a plurality of users.

19. The computer storage media of claim 11, wherein each item-dependent feature includes a feature value that is static between a plurality of users.

20. The computer storage media of claim 11, wherein the set of weights of at least one group of the plurality of groups varies based on an activity of one or more users of the social networking service.

21. A computer-implemented method that is executed using one or more processors, the method comprising:

identifying a set of items that are displayed to a user of a social networking service, one or more items of the set of items comprising digital content distributed using the social networking service and being associated with a plurality of item features, the plurality of item features comprising item-dependent features and user-dependent features;

for one or more items in the set of items, receiving a plurality of feature values, each of the feature values for each item of the one or more items being associated with one of an item-dependent feature and a user-dependent feature;

receiving a plurality of probabilities, each of the probabilities of the plurality of probabilities being associated with a group of a plurality of groups and reflecting a likelihood that the user is a type of user associated with the group, each group of the plurality of groups including a set of weights, wherein each weight of each group is associated with an item feature of the one or more items;

for one or more items in the set of items, determining an item score for the item based on i) for each group, a weighted feature value associated with each item feature of the item for the group and ii) the probability associated with each group, wherein the weighted feature value for each item feature for each group is based on i) the feature value of the item feature and ii) the weight associated with the item feature for the group; and determining a subset of items to be displayed to the user based on the item scores for each of the one or more items, the subset of items comprising items of the plurality of items.

22. The method of claim 21, wherein the weighted feature value for each item feature for each group is based on a product of i) the feature value of the item feature and ii) the weight associated with the item feature for the group.

23. The method of claim 21, wherein the probabilities in the plurality of probabilities vary based on activity of the user within the social networking service.

24. The method of claim 21, wherein determining the item score comprises selecting a group based on the plurality of probabilities, the item score being determined based on the set of weights associated with the group.

25. The method of claim 24, wherein selecting a group based on the plurality of probabilities comprises selecting the group having a highest probability.

26. The method of claim 21, further comprising transmitting instructions to display items in the subset of items to the user.

27. The method of claim 26, further comprising determining a rank order based on the items scores for each of the one or more items in the subset of items, the items of the subset of items being displayed based on the rank order.

28. The method of claim 21, wherein each user-dependent feature includes a feature value that varies between a plurality of users.

29. The system of claim 21, wherein each item-dependent feature includes a feature value that is static between a plurality of users.

30. The system of claim 21, wherein the set of weights of at least one group of the plurality of groups varies based on an activity of one or more users of the social networking service.

* * * * *